T. W. CHATFIELD.
Chimney Cowl.
No. 15,916.  Patented Oct. 14, 1856.
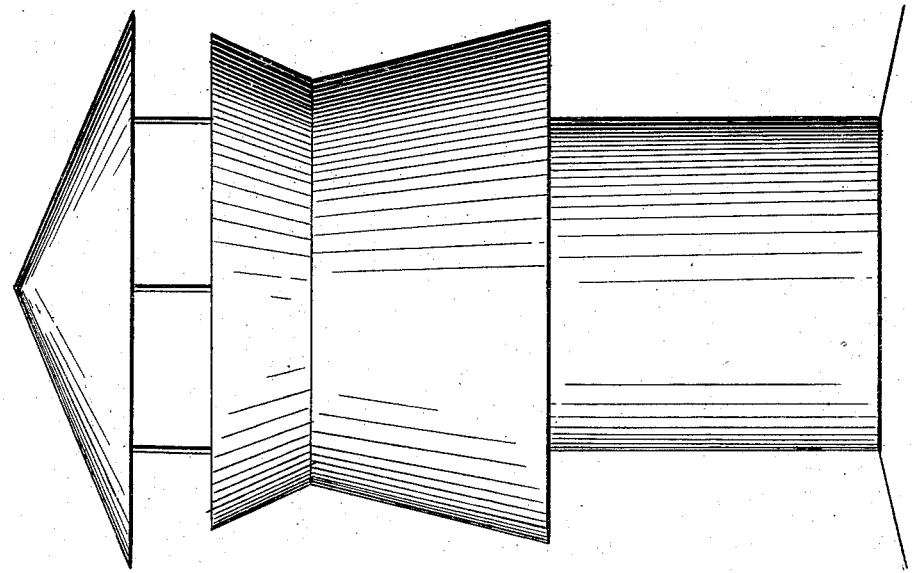
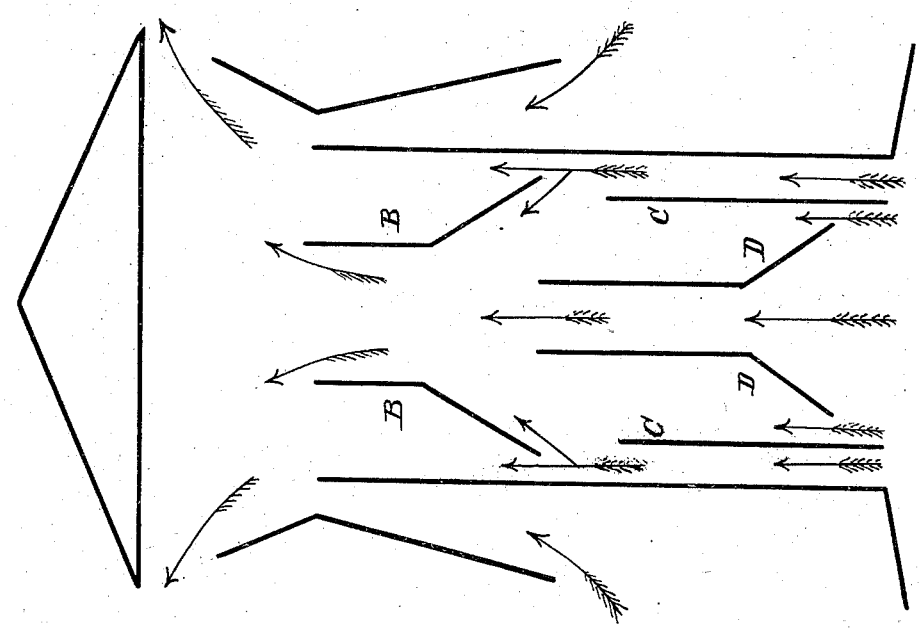

UNITED STATES PATENT OFFICE.

T. W. CHATFIELD, OF UTICA, NEW YORK.

CHIMNEY-COWL.

Specification of Letters Patent No. 15,916, dated October 14, 1856.

*To all whom it may concern:*

Be it known that I, THOMAS W. CHATFIELD, of Utica, in the county of Oneida and State of New York, have invented a new and Improved Mode of Constructing Ventilators; and I do hereby declare that the following is a full and exact description thereof, reference being had to the accompanying drawings and to the letters of reference marked thereon.

The nature of my invention consists in the arrangement of two inverted funnels and one short cylinder in place of the ordinary cones, for the purpose of creating a more powerful current of air between the body of the ventilator and the inverted funnels that can be effected by the use of ventilators constructed according to various other modes now in public use.

To enable others skilled in the art to make and use my invention I will proceed to describe its construction and operation.

I so arrange one inverted funnel of the shape shown in a sectional view of the same at Figure 1, letters B, B, that the lower end of the same may project beyond the upper end of the cylinder C, C. I also place an inverted funnel, D, D, entirely within said cylinder, the arrows showing the splitting up of the air or smoke into various separate currents until it comes to the top edge of the funnel B, B, and escapes into the atmosphere.

I find in practice on trial the within described arrangement of two inverted funnels and the short cylinder creates a more powerful upward draft of air and preventing at the same time downward currents of air, I having constructed a ventilator with said improvement six feet in diameter upon the engine house of the Central Rail Road Company at Utica on trial and found it has a more powerful upward draft than any other way.

I am aware that a patent was granted to Braer and Simonds June 13th, 1854, as also one patent to F. Emerrson July 3d, 1847, as well as other patents and rejected applications wherein the use of cones is described, which I do not claim in any way; but What I desire to claim and secure by Letters Patent is—

The improvement I have made upon said patents and rejected applications by the use of two inverted funnels B, B, and D D together with the short cylinder C C, arranged as above described.

THOMAS W. CHATFIELD.

Witnesses:
THOS. WATKIN,
FREDERICK JENNISON.